US009323922B2

United States Patent
Muralidharan et al.

(10) Patent No.: US 9,323,922 B2
(45) Date of Patent: Apr. 26, 2016

(54) DYNAMICALLY DIFFERENTIATING SERVICE IN A DATABASE BASED ON A SECURITY PROFILE OF A USER

(75) Inventors: Nithya Muralidharan, Foster City, CA (US); Daniel ManHung Wong, Sacramento, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 649 days.

(21) Appl. No.: 11/030,847

(22) Filed: Jan. 6, 2005

(65) Prior Publication Data

US 2006/0149738 A1    Jul. 6, 2006

(51) Int. Cl.
*G06F 17/30* (2006.01)
*G06F 21/55* (2013.01)

(52) U.S. Cl.
CPC .......... *G06F 21/55* (2013.01); *G06F 17/30082* (2013.01); *G06F 17/30699* (2013.01)

(58) Field of Classification Search
None
See application file for complete search history.

(56) References Cited

U.S. PATENT DOCUMENTS

| | | | | |
|---|---|---|---|---|
| 6,629,243 | B1 * | 9/2003 | Kleinman et al. | 713/163 |
| 7,237,264 | B1 * | 6/2007 | Graham et al. | 726/23 |
| 7,299,496 | B2 * | 11/2007 | Frieder et al. | 726/23 |
| 8,136,155 | B2 * | 3/2012 | Freund | G06F 21/53 726/22 |
| 2002/0178383 | A1 * | 11/2002 | Hrabik et al. | 713/201 |
| 2003/0233544 | A1 * | 12/2003 | Erlingsson | 713/167 |
| 2004/0044677 | A1 * | 3/2004 | Huper-Graff et al. | 707/102 |
| 2004/0111413 | A1 * | 6/2004 | Birbo et al. | 707/9 |
| 2004/0245330 | A1 * | 12/2004 | Swift et al. | 235/379 |
| 2005/0060579 | A1 * | 3/2005 | Dickelman et al. | 713/201 |
| 2005/0086529 | A1 * | 4/2005 | Buchsbaum | 713/201 |
| 2005/0198099 | A1 * | 9/2005 | Motsinger et al. | 709/200 |
| 2005/0203921 | A1 * | 9/2005 | Newman et al. | 707/100 |
| 2006/0224898 | A1 * | 10/2006 | Ahmed | 713/186 |
| 2006/0282660 | A1 * | 12/2006 | Varghese et al. | 713/155 |

\* cited by examiner

*Primary Examiner* — Rehana Perveen
*Assistant Examiner* — Raheem Hoffler
(74) *Attorney, Agent, or Firm* — Shun Yao; Park, Vaughan, Fleming & Dowler LLP (57) ABSTRACT

One embodiment of the present invention provides a system that differentiates service provided to a database user based on a security profile of the user. During operation, the system receives a sequence of commands from a user at a database system. The system then uses the sequence of commands to determine a security profile which indicates whether the user is behaving suspiciously. Next the system associates a resource consumer group with the user based on the security profile. Finally, the system differentiates service provided to the user based on the resource consumer group.

19 Claims, 5 Drawing Sheets

DYNAMICALLY DIFFERENTIATING SERVICE IN A DATABASE BASED ON A SECURITY PROFILE OF A USER

BACKGROUND

1. Field of the Invention

The present invention relates to database security. More specifically, the present invention relates to a method and apparatus for differentiating service based on a security profile of a user.

2. Related Art

As computer systems store ever-larger amounts of sensitive data, it is becoming increasingly important to protect this sensitive data from unauthorized accesses. The global costs incurred from such database security breaches can run into billions of dollars annually, and the cost to individual companies can be severe, sometimes catastrophic.

One of the major challenges in providing database security is to continually monitor database use by persons attempting to access or modify data beyond their authority. Unfortunately, present database security mechanisms can lock out a legitimate user if the user performs certain actions by mistake. For example, if a user mistypes a password more than a few times, the user can be locked out.

Hence, what is needed is a method and an apparatus for improving database security while providing legitimate users with good performance.

SUMMARY

One embodiment of the present invention provides a system that differentiates service provided to a database user based on a security profile of the user. During operation, the system receives a sequence of commands from a user at a database system. The system then uses the sequence of commands to determine a security profile which indicates whether the user is behaving suspiciously. Next the system associates a resource consumer group with the user based on the security profile. Finally, the system differentiates service provided to the user based on the resource consumer group.

In a variation on this embodiment, the system determines the security profile by determining a set of database tables that are accessed while executing the sequence of commands.

In a variation on this embodiment, the system determines the security profile by determining a set of database columns that are accessed while executing the sequence of commands.

In a variation on this embodiment, the system determines the security profile for the user by analyzing the sequence of commands prior to execution of the sequence of commands.

In a variation on this embodiment, the system determines the security profile for the user by analyzing the sequence of commands after executing a command in the sequence of commands.

In a variation on this embodiment, the system differentiates service provided to the user by allocating a lower percentage of CPU time to the user.

In a variation on this embodiment, the system differentiates service provided to the user by migrating the user's session to a database instance for suspicious sessions.

In a variation on this embodiment, the system differentiates service provided to the user by changing the auditing level for the user.

In a variation on this embodiment, the system differentiates service provided to the user for a current session associated with the user.

In a variation on this embodiment, the system differentiates service provided to the user for future sessions associated with the user.

In a variation on this embodiment, the system determines the security profile for the user by continually updating the security profile based on the user's behavior.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
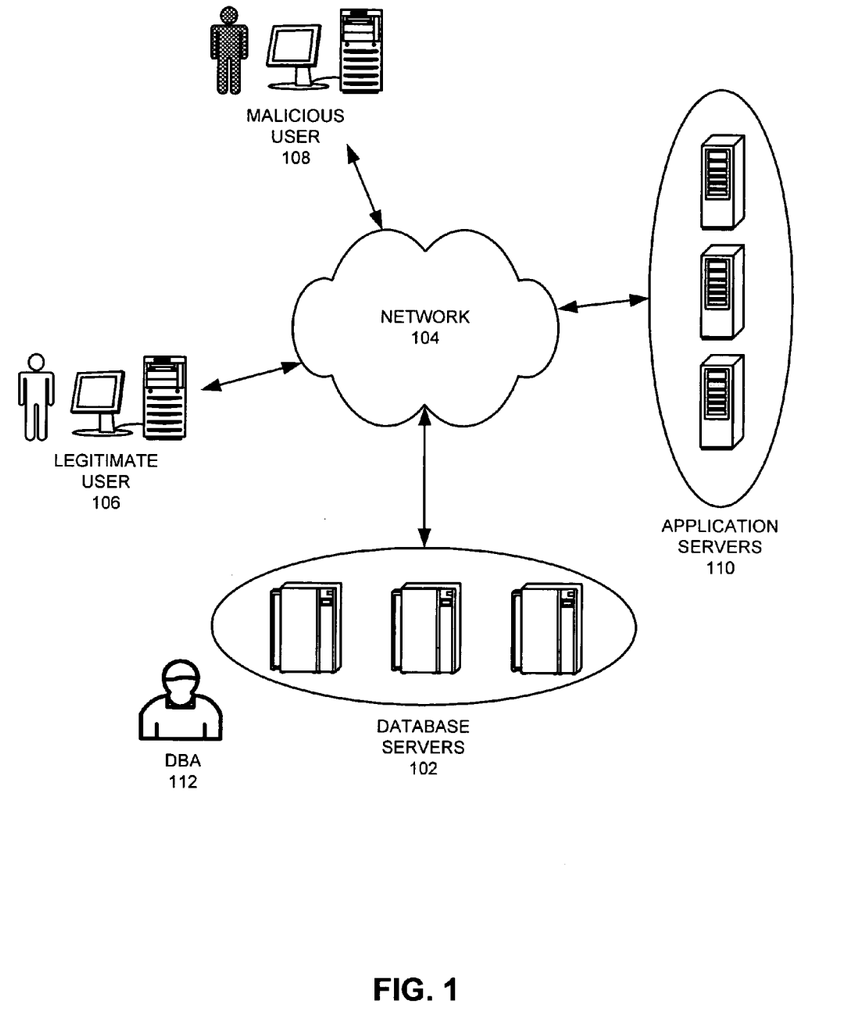
FIG. 1 illustrates a database system in accordance with an embodiment of the present invention.

FIG. 1 illustrates a database system in accordance with an embodiment of the present invention. This database system includes two users (or clients), namely, legitimate user 106 and malicious user 108. Database system also includes a set of application servers 110, a set of database servers 102, and a database administrator (DBA) 112. Users 106 and 108, application servers 110, and database servers 102 can communicate with one another via network 104.

Networks 104 can generally include any type of wire or wireless communication channel capable of coupling together computing nodes. This includes, but is not limited to, a local area network, a wide area network, or a combination of networks. In one embodiment of the present invention, network 104 can include the Internet. Network 104 can also be a private network. Note that in some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

Database administrator (DBA) 112 is responsible for the operation and maintenance of database servers 102, and typically has the privilege to modify data stored in the storage system.

Database clients allow a user, such as legitimate user 106, to enter data through a user interface, such as a web browser. This data can be sent to one of the application servers 110 across network 104. The application server then forms a database query using the data supplied by client 106 and forwards this query to the database servers 102 across network 108. Database servers 102 validate the query and, if valid, perform the requested operation.

Database systems are being used to store ever-larger amounts of sensitive data. As a result, it is becoming increasingly important to protect this sensitive data from unauthorized accesses.

One of the major challenges in providing database security is to continually monitor database use by persons attempting to access or modify data beyond their authority. For example, a database system may want to allow legitimate users, such as user 106, to access the system, but prevent malicious users, such as users 108, from accessing or modifying data.

Present database systems typically use strict security mechanisms to prevent malicious users from accessing the database. Unfortunately, these mechanisms can lock out a legitimate user if the user performs certain actions by mistake. For example, legitimate user 106 can be locked out if he/she mistypes a password more than a few times. Once the user is locked out, the user may have to wait for a long period of time before he/she can use the database system. This can be very inconvenient for the user.

In contrast, one embodiment of the present invention improves database security while allowing legitimate users to continue using the database system even if they perform certain actions by mistake, such as mistyping the password more than a few times.

Additionally, present database systems usually do not have session based security mechanisms. Unfortunately, session based security has become critically important in database systems. This is because most applications that have a database backend connect as a single user (e.g., all the online users of a small bank may connect as a single user to the database after the mid-tier resolves the user's identity). Particularly, without session based security mechanisms it can be difficult (if not impossible) to deal with security breaches in the mid-tier or front-end (e.g., an SQL injection attack), because sessions that originate from the mid-tier or front-end usually connect to the database backend as a single user.

In contrast, one embodiment of the present invention provides session based security mechanisms that can differentiate between a malicious session from a legitimate session which can allow a database to mitigate such security breaches which are a result of mid-tier or front-end security holes.

User Security Profiles and Resource Consumer Groups

In one embodiment of the present invention, the Database System Administrator (DBA) associates each user of the Database System with a User Security Profile, which indicates how good a user's behavior has been during the current session and/or in the past.

Furthermore, the User Security Profile of a user is continually updated based on the user's behavior. For example, the User Security Profile may be updated if the user performs malicious actions, such as, password guessing, long strings to test buffer overflows, escalation of privileges, inference from multiple tables, or random accesses to resources to check security loopholes.

Note that the User Security Profile of a user can contain information about the user's normal privileges, such as, tables and columns the user has access to, and system resources the user is permitted to use. These normal privileges can be used to determine whether the user is performing malicious actions or not.

In one embodiment of the present invention, a security profile can be created using the following code:

```
DBMS_SEC_QOS.CREATE_SECURITY_PROFILES (
    Group1 => 'good users',
    Group2 => 'slightly suspicious',
    Group3 => 'suspicious')
```

In one embodiment of the present invention, the DBA groups users of the system into a set of Resource Consumer Groups that are defined by the DBA. Moreover, a default Resource Consumer Group for a user can be stored in his/her User Security Profile.

The Resource Consumer Group specifies the amount of resources that the user can utilize. Specifically, in one embodiment of the present invention, the Resource Consumer Group of a user can determine the percentage of CPU time the user may utilize. In another embodiment of the present invention, the Resource Consumer Group of a user can determine the priority of the user.

Furthermore, in one embodiment of the present invention, the Resource Consumer Group of a user can determine the amount of auditing performed on the commands received from the user.

Note that the Resource Consumer Group for a user can be changed based on the user's behavior.

Suspicious Behavior

A Database System typically has a variety of users. Different users are expected to access and update different parts, e.g., tables, columns, etc., in the database. For example, a user from a human resources department is expected to access an employee's salary information, while a user from a sales and marketing department is not expected to access an employee's salary information.

When a user utilizes the database system in an unexpected manner, it can indicate an attempt to cause harm to the system. The Database System Administrator may therefore decide to treat certain types of user commands as suspicious.

Specifically, the DBA can specify rules or criteria for determining if a command constitutes suspicious behavior. Moreover, the User Security Profile of a user can also be part of some of the criteria used to decide whether a command received from the user constitutes suspicious behavior.

An example of a rule (or criterion) for determining whether a command constitutes suspicious behavior can be as follows: check if a user session has more than 10 occurrences of error ORA 1031 (insufficient privileges). More than 10 occurrences of the ORA 1031 error may indicate that an intruder is making repeated attempts to perform privileged actions in order to detect security loopholes. If a user session meets this criterion, the user's Security Profile may be permanently updated to indicate that the user is behaving slightly suspiciously.

Specifically, in one embodiment of the present invention this rule can be realized using the following code:

```
DBMS_QRT.CREATE_RULE (
    rulename => 'Too many ORA 1031s',
    userid 'scott AND adam',
    returncode => ORA 1031,
    returncode_threshold => '>10',
    global_threshold NUMBER)
DBMS_QRT.SET_RULE (combination_rule => rule1,
    action_handler =>
        DBMS_SEC_QOS.SET_SECURITY_PROFILE (
            profile_name => 'slightly suspicious',
            permanent_change => TRUE))
```

It will be apparent to one skilled in the art that a variety of conditions can be used for specifying a rule. Moreover, the User Security Profile can be updated in a variety of ways based on whether a command satisfies one or more rules (or criteria). Specifically, the changes to the User Security Profile can be temporal or permanent. Temporal changes may last till the end of the current session or until a specified amount of time has elapsed.

For example, a rule can specify that 5 attempts to guess a password is considered suspicious behavior. Moreover, if a user makes 5 attempts at guessing a password, his/her User Security Profile may be updated only for the duration of the current session without making any permanent changes.

Security Profile Analysis Engine

Figure 2:
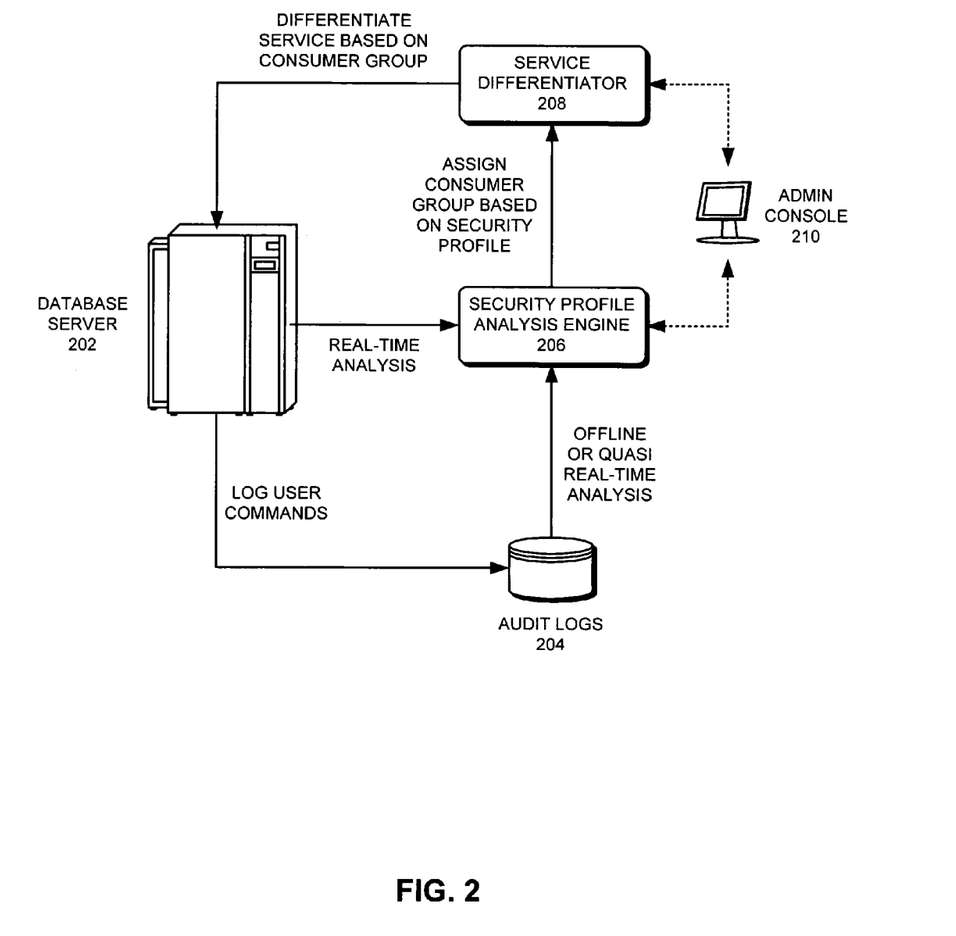
FIG. 2 illustrates how a Security Profile Analysis Engine (SPAE) can be used to differentiate service provided to a user based on the user's security profile in accordance with an embodiment of the present invention.

FIG. 2 illustrates how a Security Profile Analysis Engine (SPAE) can be used to differentiate service provided to a user based on the user's security profile in accordance with an embodiment of the present invention.

SPAE 206 receives command information directly from the database server 202 for performing real-time analysis. Alternatively, SPAE 206 can receive command information from audit logs 204 for performing offline or quasi real-time analysis. Note that offline analysis is usually performed after a long interval, such as a day. On the other hand, quasi real-time analysis is typically performed after a short time interval, such as five minutes. Furthermore, note that an ongoing user's session can be migrated as a result of performing quasi real-time analysis. Moreover, quasi real-time analysis can also be used to decide whether a session is suspicious based on the result or the op code returned by a command.

In either case, the SPAE 206 assigns a Resource Consumer Group to a user based on the security profile analysis. The Resource Consumer Group is then used by the service differentiator 208 to differentiate service provided to the user. Note that the service differentiator 208 is usually part of the database server 202. Furthermore, note that service differentiator 208 and SPAE 206 can be monitored and controlled using the admin console 210.

In one embodiment of the present invention, each user command is parsed to extract command information such as tables, columns, rows, time and privileges exercised, which is then used to determine whether the command information matches any criteria for suspicious behavior.

Specifically, in one embodiment of the present invention, SPAE 206 is integrated with the database server 202. Integrating SPAE 206 with the database server 202 enables SPAE 206 to determine whether a command constitutes suspicious behavior by examining the tables and columns that the command accesses. Note that if SPAE 206 was not integrated with database server 202, it would have been difficult (if not impossible) for SPAE 206 to obtain and use table and column access information to determine whether a command constitutes suspicious behavior.

Context Aware Load Balancer

Figure 3:
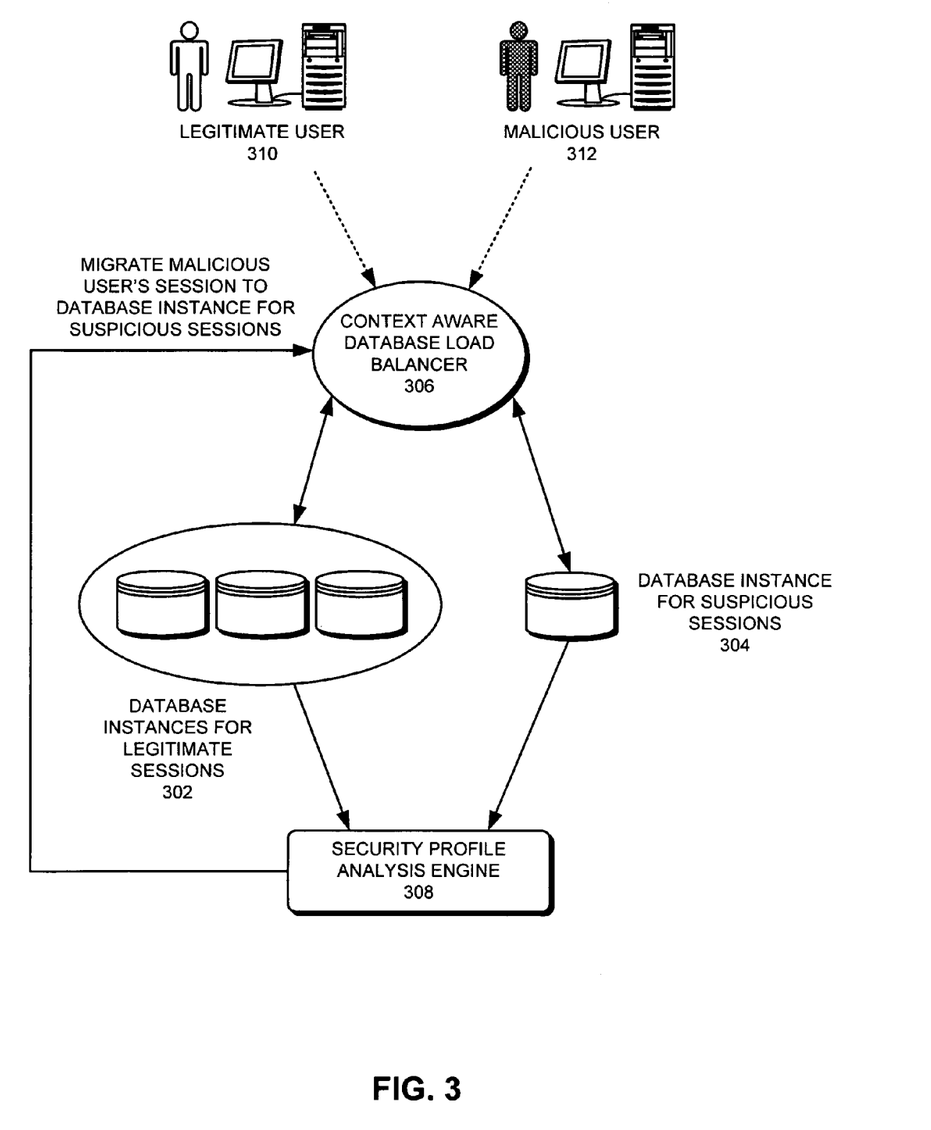
FIG. 3 illustrates how an SPAE can be used to differentiate the amount of auditing performed for a user session in accordance with an embodiment of the present invention.

FIG. 3 illustrates how an SPAE can be used to differentiate the amount of auditing performed for a user session in accordance with an embodiment of the present invention.

In one embodiment of the present invention, all commands are directed towards a database instance by a context aware load balancer 306. Context aware load balancer 306 can migrate a user session based on a variety of factors, which can include the user's security profile.

For example, suppose that legitimate user 310 and malicious user 312 are accessing the database system. Furthermore, suppose that the user profiles for both the legitimate user 310 and the malicious user 312 indicate that they are "good users." Hence, initially, context aware load balancer 306 directs both of these user sessions to the database instances for legitimate sessions 302. Subsequently, SPAE 308 analyzes the commands being executed by the malicious user 312 and changes his/her user profile to "suspicious." SPAE 308 can then request the context aware load balancer 306 to migrate the malicious user's session to a database instance for suspicious users 304.

Furthermore, if the malicious user's security profile is permanently changed to indicate that the user is "suspicious," the context aware load balancer can direct future sessions of the malicious user to the database instance for suspicious sessions 304.

Note that database instance for suspicious users 304 can have complete auditing turned on to improve auditing of the malicious user's behavior, thereby improving database security. It will be apparent to one skilled in the art that the database instance for suspicious users 304 can have a number of features that can help improve the database security. For example, in one embodiment of the present invention, the database instance for suspicious users 304 can be a "honey pot," which is a database instance that is specifically set up to attract and "trap" malicious users.

Turning on complete auditing on all database instances can be a problem because it can decrease the overall performance of the database. Note that the above described embodiment of the present invention does not have this problem because it turns on complete auditing only on some database instances, which are specifically used for handling suspicious sessions. Moreover, since legitimate sessions are not migrated to database instances with complete auditing, the database performance for legitimate users is not affected.

Differentiating Service Using Real-Time Analysis

Figure 4:
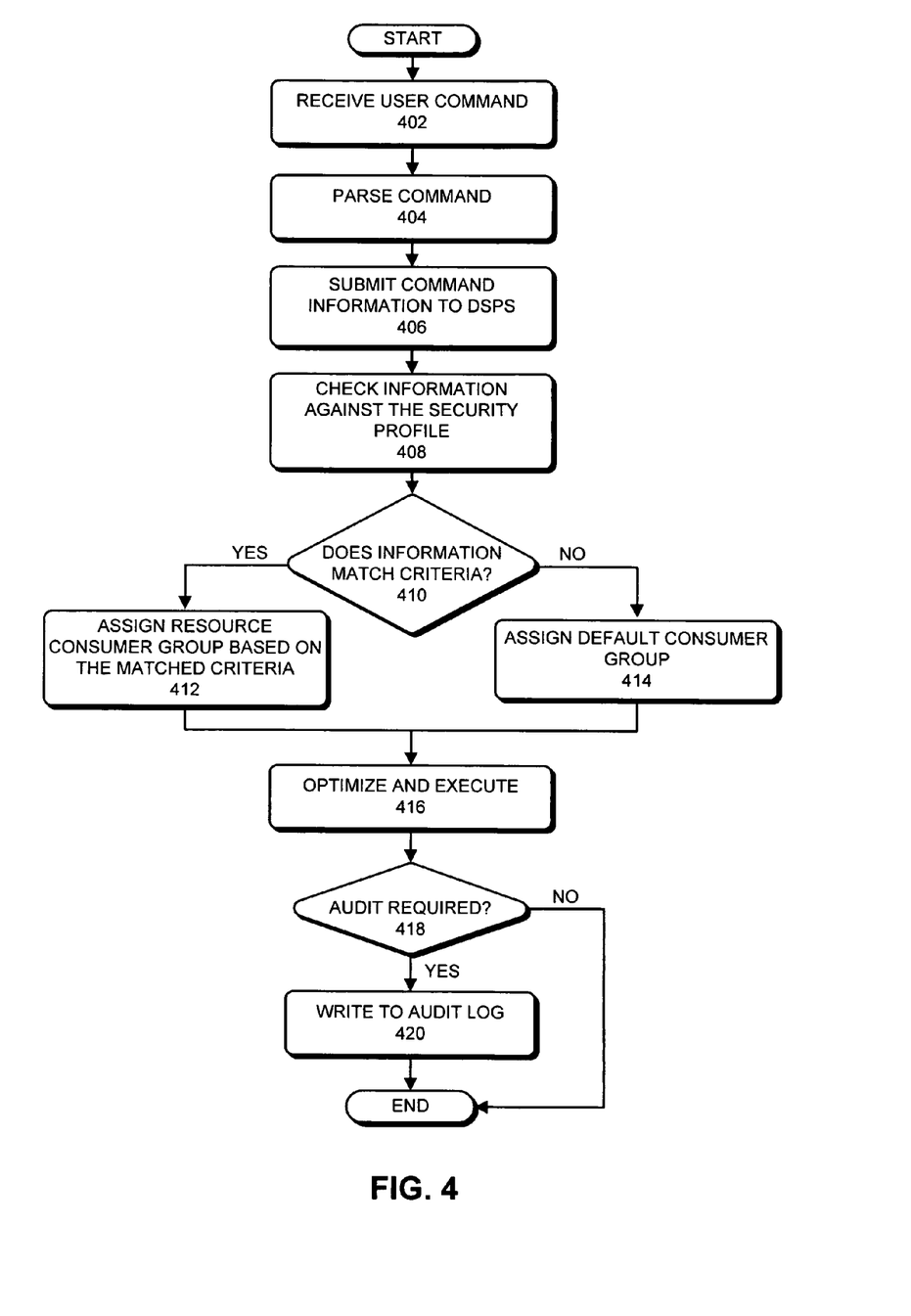
FIG. 4 presents a flowchart that illustrates a process for differentiating service based on a security profile of a user by analyzing user commands in real-time in accordance with an embodiment of the present invention.

FIG. 4 presents a flowchart that illustrates a process for differentiating service based on a security profile of a user by analyzing user commands in real-time in accordance with an embodiment of the present invention.

The process begins with receiving a user command (step 402).

Next, the system parses the user command (step 404). Note that the user command is typically parsed to extract information such as tables, columns, rows, time, and privileges.

The system then submits the command information to the Dynamic Security Profiling System (DSPS) (step 406), which performs real-time analysis on the user commands.

Next, the system uses an SPAE to check the command information against the security profile (step 408).

The system then uses the SPAE to determine whether the command information matches criteria for suspicious behavior (step 410).

If the system determines that the command information does not match any criteria for suspicious behavior, the system assigns a default consumer group to the user (step 414).

On the other hand, if the system determines that the command information matches one or more criteria for suspicious behavior, the system assigns a resource consumer group to the user based on the matched criteria (step 412). Recall that the criteria for suspicious behavior are specified by the DBA.

Next, the system optimizes and executes the command (step 416).

The system then determines whether auditing is required (step 418).

If auditing is required, the command information is written to an audit log (step 420).

Differentiating Service Using Non Real-Time Analysis

Figure 5:
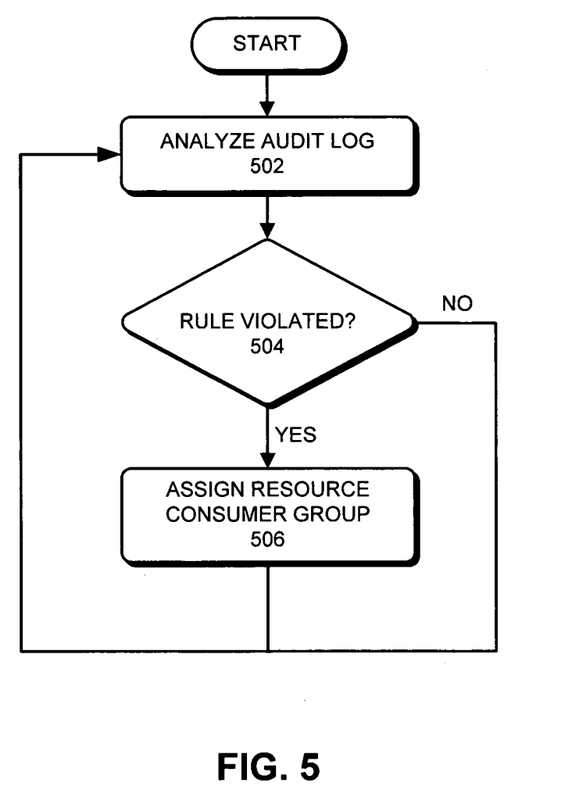
FIG. 5 presents a flowchart that illustrates a process for differentiating service using offline analysis or quasi real-time analysis of a log of user commands in accordance with another embodiment of the present invention.

FIG. 5 presents a flowchart that illustrates a process for differentiating service using offline analysis or quasi real-time analysis of a log of user commands in accordance with another embodiment of the present invention.

The process begins by analyzing an audit log that contains command information which was obtained from previous user sessions (step 502).

The system then uses an SPAE to determine whether any rules for legitimate behavior were violated (step 504). Alternatively, the system can use the SPAE to determine whether the log matches any criteria for suspicious behavior.

If the system determines that one or more rules were violated, the system assigns a resource consumer group to the user (step 506).

Next, the system can go back to step 502 after a predetermined time interval to analyze the audit log. The predetermined time interval can be short (quasi real-time analysis), such as five minutes. Alternatively, the predetermined time interval can be long (offline analysis), such as a day.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for differentiating service in a database system based on a security profile of a user, the method comprising:
   receiving a sequence of database commands from a user at a database server in the database system;
   determining command information from the database commands, wherein the extracted command information includes at least a table and a column accessed by the database commands;
   applying pre-specified rules to the command information to determine a security profile, which involves determining whether the access to the table or column matches criteria for suspicious behavior, wherein the security profile indicates a level of suspicious activity for the user;
   determining whether the security profile for the user corresponds to a high level of suspicious activity; and
   in response to determining that the security profile indicates that the user corresponds to the high level of suspicious activity, differentiating services provided to the user's session by decreasing the amount of processor time that the user is allowed to utilize to be below a percentage of processor time determined by the security profile.

2. The method of claim 1, further comprising determining a set of database tables or a set of database columns that are accessed by each command while executing the sequence of database commands.

3. The method of claim 1, wherein determining command information involves analyzing the sequence of database commands prior to execution of the sequence of database commands.

4. The method of claim 1, wherein determining command information involves analyzing the sequence of database commands after executing a command in the sequence of database commands.

5. The method of claim 1, wherein differentiating services provided to the user's session involves at least one of:
   migrating the user's session to a database instance for suspicious sessions; and
   changing the auditing level for the user's session.

6. The method of claim 1, wherein determining the security profile involves continually updating the security profile based on the user's behavior.

7. A non-transitory computer-readable storage medium storing instructions that when executed by a computer cause the computer to perform a method for differentiating service in a database apparatus based on a security profile of a user, the method comprising:
   receiving a sequence of database commands from a user at a database server in the database apparatus;
   determining command information from the database commands, wherein the extracted command information includes at least a table and a column accessed by the database commands;
   applying pre-specified rules to the command information to determine a security profile, which involves determining whether the access to the table or column matches criteria for suspicious behavior, wherein the security profile indicates a level of suspicious activity for the user;
   determining whether the security profile for the user corresponds to a high level of suspicious activity; and
   in response to determining that the security profile indicates that the user corresponds to the high level of suspicious activity, differentiating services provided to the user's session by decreasing the amount of processor time that the user is allowed to utilize to be below a percentage of processor time determined by the security profile.

8. The non-transitory computer-readable storage medium of claim 7, wherein the method further comprises determining a set of database tables or a set of database columns that are accessed by each command while executing the sequence of database commands.

9. The non-transitory computer-readable storage medium of claim 7, wherein determining the command information involves analyzing the sequence of database commands prior to execution of the sequence of database commands.

10. The non-transitory computer-readable storage medium of claim 7, wherein determining the command information involves analyzing the sequence of database commands after executing a command in the sequence of database commands.

11. The non-transitory computer-readable storage medium of claim 7, wherein differentiating services provided to the user's session involves at least one of:
   migrating the user's session to a database instance for suspicious sessions; and
   changing the auditing level for the user's session.

12. The non-transitory computer-readable storage medium of claim 7, wherein determining the security profile involves continually updating the security profile based on the user's behavior.

13. A database apparatus for differentiating service based on a security profile of a user, the apparatus comprising:

a receiving mechanism embedded in a computer system configured to receive a sequence of database commands from a user at a database server in the database apparatus;

a determining mechanism embedded in the computer system configured to:

determine command information from the database commands, wherein the extracted command information includes at least a table and a column accessed by the database commands; and apply pre-specified rules to the command information to determine a security profile, which involves determining whether the access to the table or column matches criteria for suspicious behavior, wherein the security profile indicates a level of suspicious activity for the user;

the determining mechanism further configured to determine whether the security profile for the user corresponds to a high level of suspicious activity; and a differentiation mechanism configured to differentiate services provided to the user's session by decreasing the amount of processor time that the user is allowed to utilize to be below a percentage of processor time determined by the security profile, in response to determining that the security profile indicates that the user corresponds to the high level of suspicious activity.

14. The apparatus of claim 13, wherein the determining mechanism is configured to determine a set of database tables or a set of database columns that are accessed by each command while executing the sequence of database commands.

15. The apparatus of claim 13, wherein the determining mechanism is configured to apply the pre-specified rules to the commands prior to execution of the sequence of database commands.

16. The apparatus of claim 13, wherein the determining mechanism is configured to apply the pre-specified rules to the commands after executing a command in the sequence of database commands.

17. The apparatus of claim 13, wherein the differentiating mechanism is configured to differentiate services provided to the user's session involving at least one of:

migrating the user's session to a database instance for suspicious sessions; and changing the auditing level for the user's session.

18. The apparatus of claim 13, wherein the determining mechanism is configured to continually update the security profile based on the user's behavior.

19. The apparatus of claim 13, wherein the determining mechanism is configured to generate command information by parsing each command in the sequence.

* * * * *